US006925347B1

United States Patent
Miller et al.

(10) Patent No.: US 6,925,347 B1
(45) Date of Patent: Aug. 2, 2005

(54) PROCESS CONTROL BASED ON AN ESTIMATED PROCESS RESULT

(75) Inventors: Michael L. Miller, Cedar Park, TX (US); Thomas J. Sonderman, Austin, TX (US); Alexander J. Pasadyn, Austin, TX (US); Richard J. Markle, Austin, TX (US); Brian K. Cusson, Austin, TX (US); Patrick M. Cowan, Pflugerville, TX (US); Timothy L. Jackson, Pflugerville, TX (US); Naomi M. Jenkins, Round Rock, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 116 days.

(21) Appl. No.: 10/223,174

(22) Filed: Aug. 19, 2002

(51) Int. Cl.⁷ .............................................. G06F 19/00
(52) U.S. Cl. ........................ 700/121; 438/14; 700/31; 700/44; 700/57; 702/174; 716/21
(58) Field of Search .............................. 700/44, 31, 57, 700/95, 121, 174; 716/21; 702/174; 438/14

(56) References Cited

U.S. PATENT DOCUMENTS

| | | | | |
|---|---|---|---|---|
| 5,526,293 A | * | 6/1996 | Mozumder et al. ........... 716/19 |
| 6,532,428 B1 | * | 3/2003 | Toprac ......................... 702/97 |
| 6,556,884 B1 | * | 4/2003 | Miller et al. ................. 700/121 |
| 6,560,503 B1 | * | 5/2003 | Toprac et al. ............... 700/108 |
| 6,597,447 B1 | * | 7/2003 | Stirton et al. ............ 356/237.2 |
| 6,610,550 B1 | * | 8/2003 | Pasadyn et al. ............... 438/14 |
| 6,630,362 B1 | * | 10/2003 | Lensing ........................ 438/14 |
| 2002/0095278 A1 | * | 7/2002 | Riley et al. .................... 703/2 |
| 2002/0192966 A1 | * | 12/2002 | Shanmugasundram et al. .. 438/692 |

* cited by examiner

*Primary Examiner*—Leo Picard
*Assistant Examiner*—Douglas S. Lee
(74) *Attorney, Agent, or Firm*—Williams, Morgan & Amerson, PC

(57) ABSTRACT

A method and apparatus is provided for a process control based on an estimated process result. The method comprises processing a workpiece using a processing tool, receiving trace data associated with the processing of the workpiece from the processing tool and estimating at least one process result of the workpiece based on at least a portion of the received trace data. The method further comprises adjusting processing of a next workpiece based on the estimated at least one process result.

29 Claims, 2 Drawing Sheets

PROCESS CONTROL BASED ON AN ESTIMATED PROCESS RESULT

BACKGROUND OF THE INVENTION

1. Field of the Invention

This invention relates generally to a semiconductor fabrication process, and, more particularly, to controlling the semiconductor fabrication process based on an estimated process result.

2. Description of the Related Art

There is a constant drive within the semiconductor industry to increase the quality, reliability and throughput of integrated circuit devices, e.g., microprocessors, memory devices, and the like. This drive is fueled by consumer demands for higher quality computers and electronic devices that operate more reliably. These demands have resulted in a continual improvement in the manufacture of semiconductor devices, e.g., transistors, as well as in the manufacture of integrated circuit devices incorporating such transistors. Additionally, reducing the defects in the manufacture of the components of a typical transistor also lowers the overall cost per transistor as well as the cost of integrated circuit devices incorporating such transistors.

Generally, a set of processing steps is performed on a group of wafers, sometimes referred to as a "lot," using a variety of processing tools, including photolithography steppers, etch tools, deposition tools, polishing tools, rapid thermal processing tools, implantation tools, etc. The technologies underlying semiconductor processing tools have attracted increased attention over the last several years, resulting in substantial improvements.

One technique for improving the operation of a semiconductor processing line includes using a factory wide control system to automatically control the operation of the various processing tools. The manufacturing tools communicate with a manufacturing framework or a network of processing modules. Each manufacturing tool is generally connected to an equipment interface. The equipment interface is connected to a machine interface which facilitates communications between the manufacturing tool and the manufacturing framework. The machine interface can generally be part of an Advanced Process Control (APC) system. The APC system initiates a control script based upon a manufacturing model, which can be a software program that automatically retrieves the data needed to execute a manufacturing process. Often, semiconductor devices are staged through multiple manufacturing tools for multiple processes, generating data relating to the quality of the processed semiconductor devices.

During the fabrication process, various events may take place that affect the performance of the devices being fabricated. That is, variations in the fabrication process steps result in device performance variations. Factors, such as feature critical dimensions, doping levels, contact resistance, particle contamination, film optical properties, film thickness, film uniformity, etc., all may potentially affect the end performance of the device. Various tools in the processing line are controlled in accordance with performance models to reduce processing variation. Commonly controlled tools include photolithography steppers, polishing tools, etching tools, and deposition tools. Pre-processing and/or post-processing metrology data is supplied to process controllers for the tools. Operating recipe parameters, such as processing time, are calculated by the process controllers based on the performance model and the metrology information to attempt to achieve post-processing results as close to a target value as possible. Reducing variation in this manner leads to increased throughput, reduced cost, higher device performance, etc., all of which equate to increased profitability.

Metrology data collected after the processing of a wafer or lot of wafers may be used to generate feedback information for use in determining a control action for the previous process tool. The collection of metrology data, however, may be costly in terms of process delay and resource expenditure. The delay in the process may be introduced because the processed wafers are routinely removed from the production flow and transferred to a remotely located metrology tool where characteristics of the lot are measured. The collected metrology data may then be used to control the previous or subsequent process tool in the process flow. Typically, there is a significant time period required to complete the metrology cycle of collecting the data and determining a control action based on the metrology data. The delay inherent in the metrology cycle may introduce inefficiency in the process control. Moreover, the cost of collecting metrology data can be high, as metrology tools tend to be expensive. Thus, in view of the above-mentioned reasons, it may sometimes be desirable to reduce the reliance on metrology tools for process control.

The present invention is directed to overcoming, or at least reducing the effects of, one or more of the problems set forth above.

SUMMARY OF THE INVENTION

In one embodiment of the present invention, a method is provided for a process control based on an estimated process result. The method comprises processing a workpiece using a processing tool, receiving trace data associated with the processing of the workpiece from the processing tool and estimating at least one process result of the workpiece based on at least a portion of the received trace data. The method further comprises adjusting processing of a next workpiece based on the estimated at least one process result.

In another embodiment of the present invention, an apparatus is provided for a process control based on an estimated process result. The apparatus comprises an interface communicatively coupled to a control unit. The interfaces is adapted to receive trace data associated with processing a semiconductor wafer of a lot. The control unit is adapted to estimate a process result of the semiconductor wafer based on at least a portion of the received trace data and provide the process result to a controller to adjust a process of a next semiconductor wafer of the lot.

In a further embodiment of the present invention, an article comprising one or more machine-readable storage media containing instructions is provided for a process control based on an estimated process result. The one or more instructions, when executed, enable the processor to receive trace data associated with processing of a wafer in accordance with a recipe, predict a result of the processing of the wafer based on at least a portion of the received trace data and provide the predicted result to a controller to adjust one or more parameters of the recipe based on the predicted result.

In a further embodiment of the present invention, a system is provided for a process control based on an estimated process result. The system comprises a processing tool, a fault detection and classification system and a controller. The processing tool comprises a processing tool adapted to provide trace data associated with a processing of a wafer of a lot. The fault detection and classification system is adapted to predict a process result of the processing tool on the wafer based on at least a portion of the trace data and provide the process result. The controller controls the processing of the processing tool. The controller adapted to adjust the processing of a next wafer of the lot based on at least the predicted process result.

BRIEF DESCRIPTION OF THE DRAWINGS

The invention may be understood by reference to the following description taken in conjunction with the accompanying drawings, in which like reference numerals identify like elements, and in which.

Figure 1:
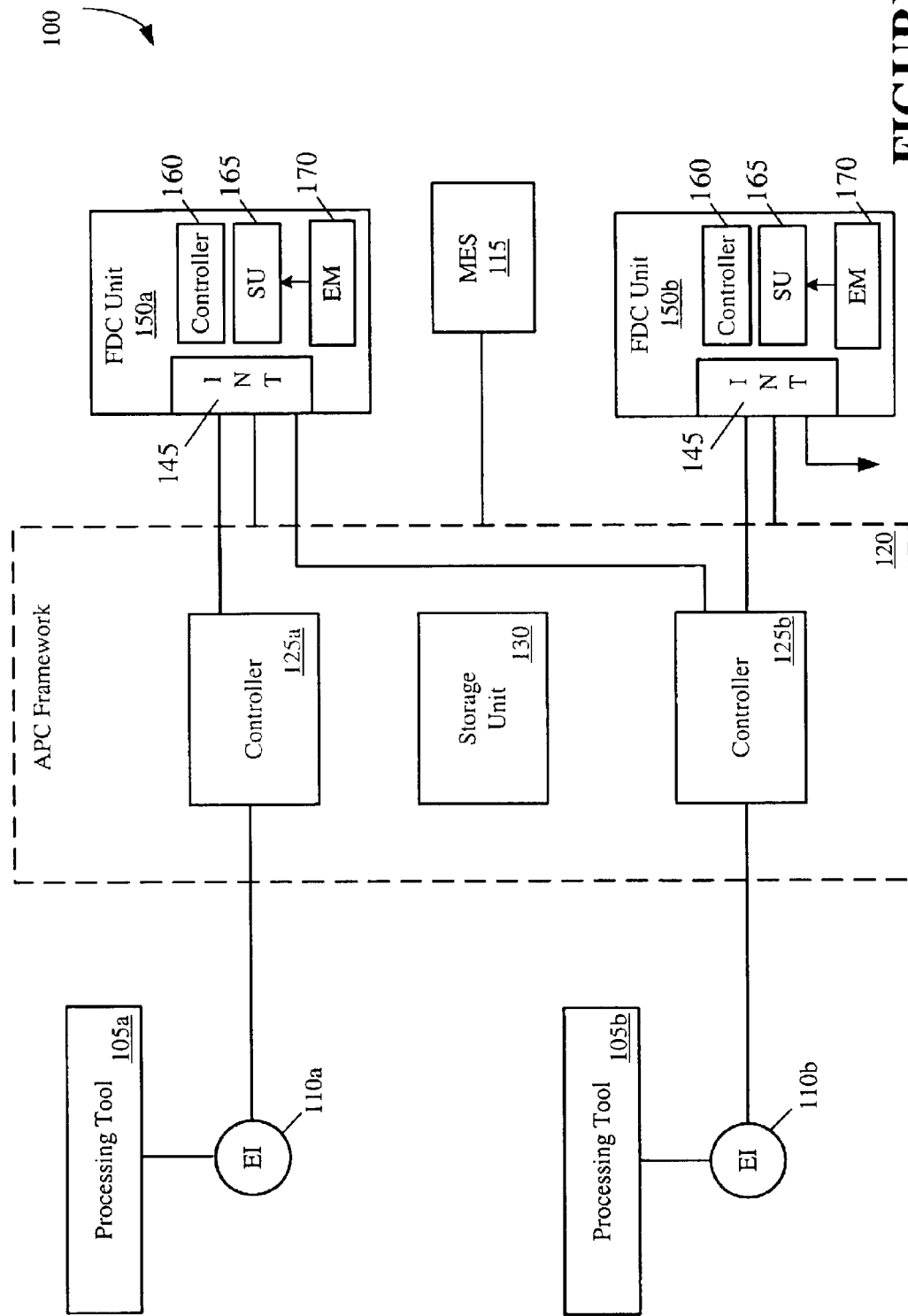
FIG. 1 illustrates a manufacturing system, including an APC framework, in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning now to the drawings, and specifically referring to FIG. 1, a manufacturing system 100 for performing a semiconductor fabrication process is provided. The manufacturing system 100 includes a first and a second processing tool 105a, 105b coupled to an Advanced Process Control (APC) framework 120 through respective equipment interfaces (EI) 110a, 110b. Although only two processing tools 105 are shown in the illustrated embodiment, alternative embodiments may include additional or fewer processing tools, depending on the implementation. The second processing tool 105b is downstream to the first processing tool 105a, in the illustrated embodiment.

The processing tools 105 in the illustrated embodiment may take the form of any semiconductor fabrication equipment used in manufacturing or packaging integrated circuit devices. The techniques described herein may be applied to a variety of workpieces including, but not limited to, microprocessors, memory devices, digital signal processors, application specific integrated circuits (ASICs), or other similar devices. Exemplary processing tools 105 may include an exposure tool, etch tool, deposition tool, polishing tool, rapid thermal processing tool, test-equipment tool, implantation tool, packaging tools, and the like. It should be understood that the processing tools 105 need not necessarily be limited to processing integrated circuit devices, but may produce a variety of different types of commercial products without departing from the spirit and scope of the present invention. Thus, the present invention should not be considered as being limited to the processing of any particular type of product unless such limitations are expressly set forth in the appended claims.

The manufacturing system 100 may include a Manufacturing Execution System (MES) 115 that manages and controls the overall operation of the processing tools 105. For example, the manufacturing execution system 115 may determine what processes are to be performed by the processing tools 105, when these processes are to be performed, how these processes are to be performed, etc.

The processing tools 105a, 105b each operate under the direction of a respective controller 125a, 125b, which may be part of the APC framework 120. The APC framework 120, in one embodiment, may include a storage data unit 130 for storing process-related data. In the illustrated embodiment, through a feedback process, the controllers 125a and 125b aid the processing tools 105a and 105b, respectively, towards producing a desired result defined by recipes associated with those processing tools 105a, 105b. The controllers 125a and 125b each may include an interface (not shown) for communicating with one or more components of the manufacturing system 100.

An exemplary APC framework 120 that may be suitable for use in the manufacturing system 100 may be implemented using the Catalyst system offered by KLA-Tencor, Inc. The Catalyst system uses Semiconductor Equipment and Materials International (SEMI) Computer Integrated Manufacturing (CIM) Framework compliant system technologies and is based on the Advanced Process Control (APC) Framework. CIM (SEMI E81-0699 Provisional Specification for CIM Framework Domain Architecture) and APC (SEMI E93-0999—Provisional Specification for CIM Framework Advanced Process Control Component) specifications are publicly available from SEMI, which is headquartered in Mountain View, Calif.

The manufacturing system 100, in the illustrated embodiment, includes fault detection and classification (FDC) units 150a, 150b for detecting and classifying faults associated with the respective processing tools 105a, 105b. In the illustrated embodiment, the APC framework 120 is coupled to each of the FDC units 150 through an interface 145, where the interface 145 may be any acceptable structure(s) that allow(s) the FDC units 150 to communicate with other devices. The FDC units 150, in one embodiment, include a controller 160, storage unit (SU) 165, and an estimator module (EM) 170.

As is described in more detail below, the estimator module 170 is adapted to estimate the result of the process from the processing tool 105a based on the received trace data from the processing tool 105a. It should be understood that, in one embodiment, the estimated process result may be a plurality of results, and thus may be more than a single parameter. For example, in a deposition process, the estimated process result may include the thickness of the material as well as a surface profile of the deposited material. The estimated process result from the estimator module 170 may be utilized for various reasons that are more fully described below. For example, the estimated process result may be provided to the controller 125a to adjust the processing of the subsequent wafers in a lot. The estimated process result(s) may also be provided to the controller 125b of the downstream processing tool 105b to adjust the downstream process, and such results may also be used to predict wafer electrical test (WET) parameters.

The estimator module 170 in the illustrated embodiment is implemented in software, and may be stored in the storage unit 165 of the FDC unit 150. In other embodiments, the estimator module 170 may be implemented in hardware or firmware. For illustrative purposes, the estimator module 170 is shown resident in the FDC units 150, although it should be noted that the estimator module 170 may be implemented in any suitable component of the manufacturing system 100, including in the controllers 125. In one embodiment, the estimator module 170 may be implemented in a standalone unit, such as a data processing unit or computer.

It should be understood that the illustrated components shown in the block diagram of the system 100 in FIG. 1 are illustrative only, and that, in alternative embodiments, additional or fewer components may be utilized without deviating from the spirit or scope of the invention. For example, in one embodiment, the MES 115 may interface with the APC framework 120 through an associated equipment interface. Additionally, it should be noted that although various components, such as the equipment interface 110 of the system 100 of FIG. 1 are shown as stand-alone components, in alternative embodiments, such components may be integrated into the processing tools 105. Similarly, the fault detection and process control units 150a, 150b may be integrated into the APC framework 120. The controllers 125a, 125b calculate new recipe parameters based on the trace data received from the respective processing tools 105a, 105b and based on information (described in greater detail below) provided by the FDC units 150. The new recipe parameters aid the processing tools 105 in moving toward a desired result (or target).

Figure 2:
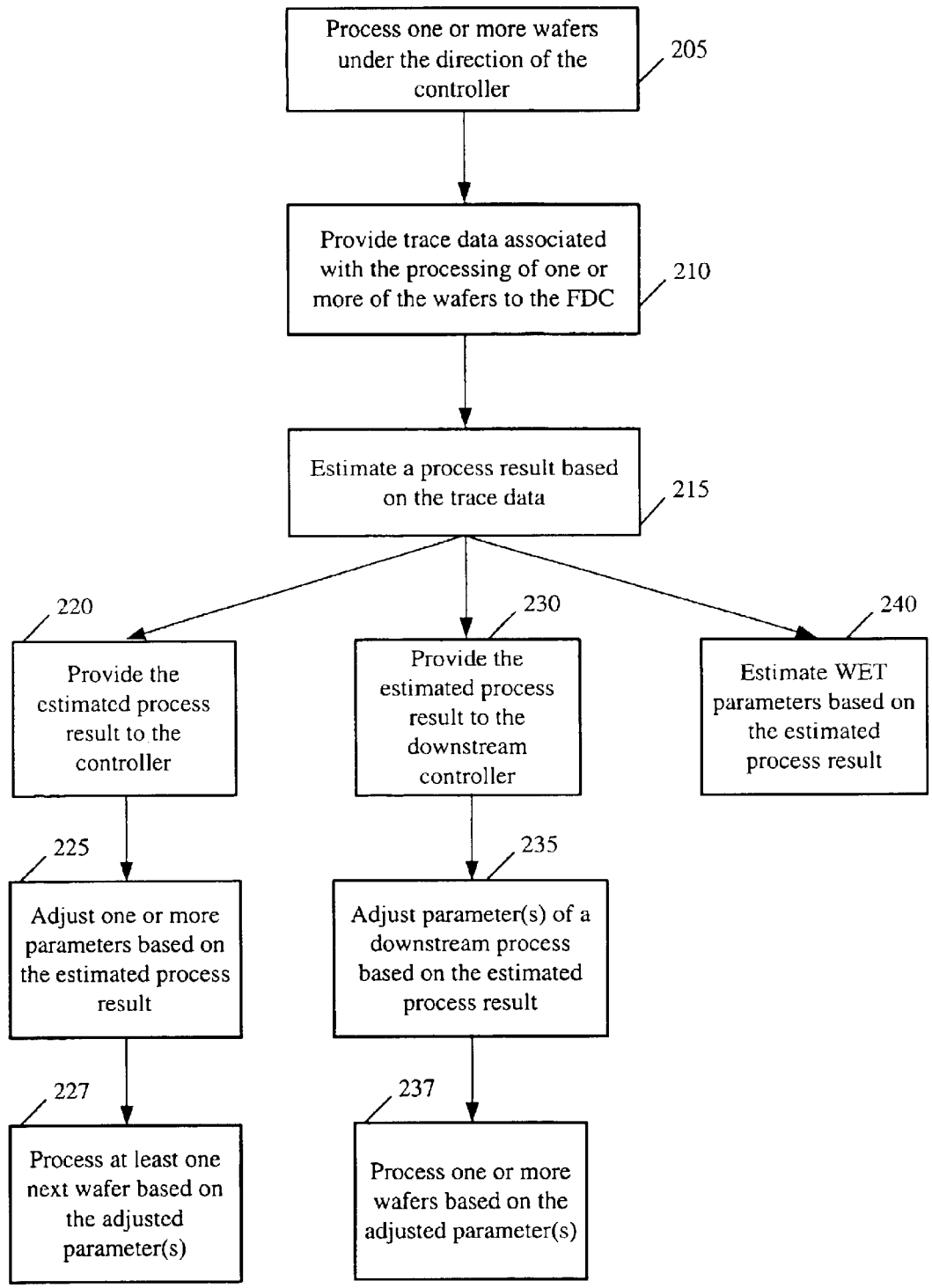
FIG. 2 illustrates a flow diagram of a method that may be implemented in the manufacturing system of FIG. 1, in accordance with one embodiment of the present invention.

Referring now to FIG. 2, a flow diagram of a method that may be implemented in the manufacturing system 100 of FIG. 1 is illustrated, in accordance with one embodiment of the present invention. The processing tool 105a processes (at 205) one or more wafers under the direction of the controller 125a. The processing tool 105a, in one embodiment, may process a group (i.e., "lot") of wafers. For illustrative purposes, the method of FIG. 2 is described in the context of a semiconductor manufacturing process in which wafers are employed. It should be understood, however, that the method of FIG. 2 may be applicable to a process other than a semiconductor process in which process control over workpieces is desired.

As the processing tool 105a processes (at 205) the one or more wafers, trace data associated with the processing tool 105a (or associated with the processing of the wafers) is provided (at 210) to the FDC unit 150a. In one embodiment, the trace data is provided (at 210) to the FDC unit 150a in substantially real time. The type of trace data provided to the FDC unit 150a may naturally vary with the particular type of processing tool 105a that is employed. For example, a deposition tool may provide the FDC unit 150a with trace data that includes gas flow rates, electrode gap (the distance between a gas showerhead and wafer surface) chamber pressure, chamber temperature, processing time, and the like. As an additional example, a polishing tool may provide the FDC unit 150a with trace data that includes polish time, downforce, polishing pad speed, motor current, polishing arm oscillation magnitude and frequency, slurry chemical composition, temperature inside the tool, and the like.

Similarly, in other embodiments, a variety of other types of trace data may be received by the FDC unit 150a.

The estimator module 170 of the FDC unit 150a estimates (at 215) a process result of the processing tool 105a based on at least a portion of the trace data that is provided (at 210). The process result estimated by the estimator module 170 may vary according to the particular processing tool 105a that is employed or the particular process that is implemented. For example, with respect to a deposition process, the estimator module 170 may estimate the thickness of the material deposited on the wafers. As an additional example, with respect to a polishing process, the estimator module 170 may estimate the polishing end point (duration), and with respect to an etching process, the estimator module 170 may estimate the etching depth of the etching process. The process result may be estimated in various ways, including by applying at least a portion of the received trace data to a model that is representative of the process that is carried out by the processing tool 105a. The model may be generated, in one embodiment, based on historical data, for example, of previously processed wafers.

In one embodiment, once the estimator module 170 of the FDC unit 150a estimates (at 215) the process result based on at least a portion of the received trace data, the estimated process result may be provided (at 220) to the controller 125a, which in the illustrated example is associated with the processing tool 105a. Based on the estimated result, the controller 125a adjusts (at 225) one or more recipe parameters to aid the processing tool 105a in moving toward a desired result (or target). The "parameters" may include recipe parameters, the processing tool parameters, or both. As an example, assuming that the processing tool 105a is a deposition tool, the FDC unit 150a estimates the deposition thickness of the processed wafers based on the trace data associated with those processed wafers and provides the estimated deposition thickness to the controller 125a.

The controller 125a adjusts its control process to move toward the thickness desired based on the estimated deposition thickness provided by the FDC unit 150a. In one embodiment, because the estimated process result provided by the FDC unit 150a is based on the real-time trace data, the controller 125a is able to adjust its process at the wafer level (as opposed to a "lot" level). That is, because the FDC unit 150a is capable of providing an estimate based on a previously processed wafer of a given lot, the controller 125a can adjust the recipe of the processing tool 105a for subsequent wafers within the same lot. The processing tool 105a processes (at 227) the next wafer or wafers based on the adjusted parameters (at 225).

In one embodiment, the FDC unit 150a may also provide the estimated process result (at 230) to the downstream controller 125b, which in the illustrated example is associated with the processing tool 105b. Thus, in this embodiment, the estimated process result may be utilized for wafer-to-wafer feed forward control. Of course, if desired, the estimated process result provided by the FDC unit 150a may be utilized for a wafer lot-level or site-level feedback or feed forward control as well. The estimated process result, in the illustrated embodiment, is provided (at 230) to the downstream controller 105b because it may be useful to know the processed state of the wafers before the next processing step is performed. For example, if the downstream processing step is a polish operation, which is intended to polish the film down to some uniform thickness across the wafer, it may be useful to know the initial thickness of the as-deposited film on the incoming wafers (particularly at the wafer level) so that the polishing time needed for the polish operation can be calculated to achieve the desired result.

Based on the estimated result, the controller 125b adjusts (at 235) the parameters (recipe and/or tool parameters) to aid the downstream processing tool 105b in moving towards the desired result (or target). As mentioned, in accordance with one embodiment of the present invention, the controller 125b is provided wafer-level estimated results from the upstream process that enable the downstream controller 125b to adjust the recipe of the processing tool 105b on a wafer by wafer basis. In one embodiment, the processing tool 105b parameters or settings may be adjusted on a wafer-by-wafer basis. The downstream processing tool 105b processes (at 237) one or more wafers based on the adjusted parameters (at 235).

In one embodiment, the FDC unit 150b associated with the downstream process estimates the process result of the processing tool 105b and provides the result to the controller 125b. The manner in which the process result is estimated may be accomplished in a variety of ways. In one embodiment, the process result may be estimated by applying at least a portion of the received trace data to a model that is representative of the process that is carried out by the downstream processing tool 105b. The model may be generated, in one embodiment, based on historical data, for example, of previously processed wafers. The controller 125b may adjust its recipe parameters or tool parameters based on the estimated process result. Thus, in one embodiment, the downstream controller 125b may adjust its process based on the estimated result provided the FDC unit 150b and by the FDC unit 150a associated with the upstream process.

In one embodiment, based on the estimated process result(s) that are provided (at 215) by the FDC unit 150a, it is possible to estimate (at 240) one or more wafer electrical test (WET) parameters associated with the processed wafers. WET parameters are measured to verify whether the electrical characteristics of the processed wafers (or integrated circuit devices) are within product specification. In some cases, WET parameters are ascertained after the processing of the wafers is complete, perhaps several weeks or months after the processing is complete. Instead of waiting for the processing cycle to complete, in one embodiment of the present invention, it may be possible to estimate the WET parameters of the processed wafers based on applying the collected trace data from the processing tools 105 to a model that is representative of a testing tool that measures WET parameters. In an alternative embodiment, the WET parameters may be estimated after all of the processing is complete. That is, the WET parameters may be estimated once all of the estimated process results have been collected and analyzed from all of the processes.

Although only two processing tools 105a, 105b are illustrated in the manufacturing system 100 of FIG. 1, it should be appreciated that in alternative embodiments the overall process flow may include more than two processing tools 105. In one embodiment, the estimated results of the upstream process may be provided to any or all of the downstream processes. For example, if the overall process flow includes five separate processes, in one embodiment, the estimated process result from the first process may be provided to one or more of the downstream processes. Similarly, the estimated process result from the second process may be provided to one or more of the processes that are downstream to the second process. In one embodiment, the estimated process result may also be provided to upstream processes, if desired.

In accordance with one embodiment of the present invention or more embodiments of the present invention, one or more results of a process flow are estimated based on collecting trace data associated with the processed wafers. The estimated result(s) may be utilized to adjust the control process to achieve the desired process goal. In some instances the estimate module 170 of the FDC units 150 may be used in lieu of the more expensive metrology tool to aid in controlling the process flow. In other instances, depending on the desired objective, the estimate module 170 may be utilized in conjunction in a metrology tool to meet the desired objective. That is, in one embodiment, the process control may be adjusted based on both metrology data and the estimated process result(s). The metrology data may be inline or offline metrology data.

The various system layers, routines, or modules may be executable by the controllers 125, 160 (see FIG. 1). As utilized herein, the term "controller" may include a microprocessor, a microcontroller, a digital signal processor, a processor card (including one or more microprocessors or controllers), or other control or computing devices. The storage unit 130, 165 (see FIG. 1) referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by a respective control unit cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
    processing a workpiece using a processing tool;
    receiving trace data associated with the processing of the workpiece from the processing tool;
    estimating at least one process result of the workpiece based on at least a portion of the received trace data; and
    adjusting processing of a next workpiece based on the estimated at least one process result.

2. The method of claim 1, wherein adjusting the processing of the next workpiece comprises adjusting at least one of one or more recipe parameters and tool parameters of the processing tool based on the estimated at least one process result.

3. The method of claim 2, wherein estimating the at least one process result comprises applying the received trace data to a model that is representative of the processing of the workpiece.

4. The method of claim 3, wherein processing the workpiece comprises processing a semiconductor wafer.

5. The method of claim 1, further comprising providing the at least one estimated result to a downstream processing tool.

6. The method of claim 5, further comprising adjusting at least one of one or more recipe parameters of the downstream process and tool parameters based on the estimated at least one process result.

7. The method of claim 1, further comprising estimating wafer electrical test parameters based on the at least one estimated process result.

8. An apparatus, comprising:
   an interface adapted to receive trace data associated with processing a semiconductor wafer of a lot from a process tool; and
   a control unit communicatively coupled to the interface, the control unit adapted to:
      estimate a process result of the semiconductor wafer based on at least a portion of the received trace data, and
      provide the process result to a controller to adjust a process of a next semiconductor wafer of the lot.

9. The apparatus of claim 8, wherein the control unit is adapted to provide the process result to control a downstream processing tool.

10. The apparatus of claim 9, wherein the control unit is adapted to provide the process result to a plurality of downstream processes.

11. The apparatus of claim 8, wherein the trace data comprises at least one of gas a flow rate, electrode gap, chamber pressure, chamber temperature, and processing time.

12. The apparatus of claim 8, wherein the process result comprises a plurality of results.

13. The apparatus of claim 8, wherein the control unit is adapted to provide the process result to an upstream process.

14. The apparatus of claim 8, wherein the control unit is adapted to provide the process result to estimate one or more wafer electrical test parameters.

15. An apparatus comprising:
   means for processing a workpiece using a processing tool;
   means for receiving trace data associated with the processing of the workpiece from the processing tool;
   means for estimating at least one process result of the workpiece based on at least a portion of the received trace data; and
   means for adjusting processing of a next workpiece based on the at least one estimated process result.

16. An article comprising one or more machine-readable storage media containing instructions that when executed enable a processor to:
   receive trace data associated with processing of a wafer in accordance with a recipe;
   predict a result of the processing of the wafer based on at least a portion of the received trace data; and
   provide the predicted result to a controller to adjust one or more parameters of the recipe based on the predicted result.

17. The article of claim 16, wherein the instructions when executed enable the processor to provide the result to adjust at least one of one or more recipe tool parameters of a downstream process.

18. The article of claim 16, wherein the instructions when executed enable the processor to provide the predicted result to an upstream process.

19. The article of claim 16, wherein the instructions when executed enable the processor to provide the predicted result to two or more downstream processes.

20. The article of claim 16, wherein the instructions when executed enable the processor to estimate one or more wafer electrical test parameters based on the predicted result.

21. An apparatus, comprising:
   an interface; and
   a controller communicatively coupled to the interface, the controller adapted to:
      receive a predicted result of a process, the process having an associated recipe;
      calculate at least one parameter of the recipe based on the received predicted result; and
      cause processing of a wafer based on the at least one calculated recipe parameter.

22. The apparatus of claim 21, wherein the controller is adapted to receive the predicted result from a fault detection unit.

23. A system, comprising:
   a processing tool adapted to provide trace data associated with a processing of a wafer of a lot;
   a fault detection and classification system adapted to:
      predict a process result of the processing tool on the wafer based on at least a portion of the trace data; and
      provide the process result; and
   a contoller for controlling the processing of the processing tool, the controller adapted to adjust the processing of a next wafer of the lot based on at least the predicted process result.

24. The system of claim 23, wherein an advanced process control is coupled between the processing tools and the fault detection and classification system.

25. The method of claim 1, wherein the processing the workpiece comprises processing the workpiece according to a recipe that defines one or more steps to perform on the workpiece.

26. The method of claim 1, wherein the receiving trace data comprises receiving the trace data that does not include metrology data.

27. The method of claim 1, wherein adjusting processing the next workpiece comprises adjusting the processing based substantially only on the estimated process result.

28. The apparatus of claim 8, wherein the control unit is adapted to receive trace data that does not include metrology data.

29. The apparatus of claim 8, wherein the control unit is adapted to provide the process result based substantially only on the estimated process result.

* * * * *